United States Patent [19]

Siminski

[11] Patent Number: 5,981,086
[45] Date of Patent: Nov. 9, 1999

[54] DUAL-LAYER COATING ON HIGH-TENSILE STEEL

[75] Inventor: Michael C. Siminski, Sinking Spring, Pa.

[73] Assignee: Morton International, Inc., Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/728,237

[22] Filed: Oct. 8, 1996

[51] Int. Cl.$^6$ ............... B21D 39/00; B35B 27/38; B05D 5/00; B05D 1/36

[52] U.S. Cl. ............... 428/624; 428/626; 428/414; 428/416; 428/418; 428/500; 427/195; 427/203; 427/35; 427/384; 427/386; 427/388.1; 427/410

[58] Field of Search ............... 428/402, 328, 428/403, 407, 414, 416, 418, 624, 626, 500; 427/195, 203, 375, 384, 386, 388.1, 410

[56] References Cited

U.S. PATENT DOCUMENTS

| | | | |
|---|---|---|---|
| 3,336,251 | 8/1967 | Manasia | 260/18 |
| 3,769,069 | 10/1973 | Sawyer | 117/75 |
| 3,860,557 | 1/1975 | Millar et al. | 260/41 |
| 4,237,037 | 12/1980 | Takahashi | 260/28.5 |
| 4,316,939 | 2/1982 | Guyomard | 428/413 |
| 4,345,004 | 8/1982 | Miyata et al. | 428/416 |
| 5,334,631 | 8/1994 | Durand | 523/459 |
| 5,562,989 | 10/1996 | Statz | 428/402 |

OTHER PUBLICATIONS

General Motors Published Test, Chip Resistance of Coating, GM 9508P, Jul. 1991.
General Motors Published Test, Scab Corrosion Creepback of Elpo Paint Systems on Metal Substrates, GM 9511P, Oct. 1986.
General Motors Published Test, CASS—Copper Accelerated Acetic Acid Salt Spray Test, GM 4476P, Nov. 1988.

*Primary Examiner*—Paul Thibodeau
*Assistant Examiner*—Holly C. Rickman
*Attorney, Agent, or Firm*—Wayne E. Nacker; Gerald K. White

[57] ABSTRACT

High-tensile steel, particularly automotive coil springs formed of high-tensile steel, are coated first with an epoxy coating powder containing high levels of zinc and then with a poly(ethylene/acrylic acid copolymer) coating powder. Both coatings are applied and fused or fused and cured at temperatures of 325° F. or below so as not to affect the metallurgic properties of the steel. The dual-coating protects the steel from pitting and corrosion.

14 Claims, No Drawings

DUAL-LAYER COATING ON HIGH-TENSILE STEEL

The present invention is directed to a two-layer coating suitable for protecting high-tensile steel, such as automotive springs formed of high-tensile steel and subject to corrosive conditions.

BACKGROUND OF THE INVENTION

Steel coil springs in the wheel assemblies of automobiles and other vehicles are subjected to very corrosive conditions. Conventional steel springs were expected to rust, and to allow for such rusting, conventional coil springs were formed of appropriately thick steel.

To improve the steering and ride control of automobiles, it is desirable to move the wheels outward, toward the corners of the vehicle. This increases torsional stress on the automobile body structure which must be nullified using a stronger frame assembly or weight reduction of the suspension components moved toward the corners. Reduced diameter, high tensile steel, coil springs weigh less than conventional automotive suspension coil springs, so they offer means to reduce the weight of these components.

High tensile steel, coil springs are scratch and notch sensitive, so they require protection from impact damage caused by flying stones and gravel encountered during driving on paved or unpaved roads. Also, to maintain desired metallurgical properties and prevent premature flex damage failure, the high tensile steel cannot be heated beyond 325° F.

Conventional "E" coat primers and/or epoxy powder coatings used on strut type automotive suspension springs are unacceptable at inhibiting flying stone damage as determined by low temperature gravelometer testing followed by accelerated scab corrosion testing of high tensile springs. Neither layer applied alone will provide the chip and corrosion protection required.

It is an object of the present invention to provide a coating for high tensile steel springs and the like which protects the steel when subject to both impact and corrosive environments. A further requirement when coating high-tensile steel is that the coating be applied, fused, cured, etc. at relatively low temperatures, i.e., 325° F. (163° C.) or below and preferably 300° F. (149° C.) or below. If subjected to significantly higher temperature during coating, the metallurgy of the high-tensile steel tends to change, resulting in flex damage failure of the spring.

SUMMARY OF THE INVENTION

In accordance with the invention high-tensile steel is coated with a first epoxy coating containing at least about 75 phr Zn and a second elastomeric coating, preferably poly (ethylene/acrylic acid) (EAA). Both the first and the second coating may be applied as coating powders, and fused or fused and cured at temperatures of 325° F. and below and even at 300° F. and below. The dual coating of the present invention provides resistance to chipping down to −10° C. and flexibility down to −30° C.

DETAILED DESCRIPTION OF CERTAIN PREFERRED EMBODIMENTS

Herein, unless otherwise noted, percentages are in weight percent. The term "phr" is a weight measurement meaning "Parts per Hundred Resin" (by weight) and relates to the total resin in a coating powder, including any curative which becomes part of the cured resin.

The coating powder of Zn-loaded epoxy resin may be coated directly onto a high-tensile steel component. Preferably, however, the high-tensile steel is coated first with zinc phosphate.

The epoxy resin may be chosen from a variety of epoxy resins useful for coating powders known in the art, such as those produced by the reaction of epichlorohydrin or polyglycidyl ether and an aromatic polyol such as bisphenol, e.g., bisphenol A. The epoxy resin should have an epoxy functionality greater than 1.0 and more preferably greater than 1.9. Generally the epoxy equivalent weight should be at least 170, but lower values may be possible in some cases; for example it may be 100 or more. Preferably the epoxy equivalent weight is less than 2300, especially less than 1000, for example from 130 to 1500, especially 150 to 800. Such epoxy resins may be produced, for example, by an etherificiation reaction between an aromatic or aliphatic polyol and epichlorohydrin or dichlorohydrin in the presence of an alkali such as caustic soda. The aromatic polyol may be, for example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihdyroxybenzophenone or 1,5-pentanediol, 1,6-hexanediol, diethylene glycol, triethylene glycol, polyethylene glycol, polypropylene glycol or dipropylene glycol, for example diglycidyl ethers or condensed glycidyl ethers of such diols, can be used. Other oxirane group-containing polymers that can be used as the epoxy resin in hybrid powder coating compositions according to this invention include polyglycidyl-functional acrylic polymers or epoxy novolak resins. Preferred epoxy resins include those sold under the trademarks ARALDITE GT-7072, 7004, 7013, 7074, and EPON 1002, 1004, 2004, and 2002, and DER 662, 664, and 667.

Typically the coating powder will contain a curative for the epoxy, such as an amine curative, and/or an epoxy cure catalyst.

The primary requirement for the epoxy coating powder is that it can carry high levels of zinc metal, either in powder or flake form, i.e., at least about 75 phr Zn and preferably at least about 100 phr Zn, up to the carrying capacity of the epoxy resin, e.g., up to about 250 phr Zn, and that the epoxy coating fuse and cure at 325° F. or below, preferably 300° F. or below. One useful type of epoxy coating powder is based on bisphenol A using CASAMINE OTB as a curative. Such coating powders are sold, for example, as Corvel® coating powders, e.g., Corvel® 13-7004 zinc rich epoxy, by Morton International. For purpose of coating high-tensile steel springs, coating powder is provided sufficient to provide a coating of at least about 1.5 mil, preferably at least about 2 mil, up to about 5 mil.

The zinc of the zinc-rich epoxy coating provides corrosion resistance to the high-tensile steel while the epoxy binder provides adherence to the steel and adhesion of the zinc particle or flakes. The epoxy coating, however, is brittle, and alone does not stand up to abrasions, such as being pummeled with gravel. Thus, if only Zn-rich epoxy is used to coat the steel, it would soon chip away under highway conditions, leaving the underlying steel exposed to pitting and corrosion.

Thus in accordance with the invention, a second coating in the form of a resilient elastomer is provided over the Zn-rich epoxy coating. Such an elastomer is typically thermoplastic, being applicable and fusible as a coating powder at 325° F. or below, preferably 300° F. or below.

Also, the coating must adhere well to the Zn-rich epoxy layer. In this regard, highly non-polar elastomers, such as polypropylene, do not work well. A preferred thermoplastic elastomeric second coat is poly(ethylene/acrylic acid copolymer) having a monomer content of between about 80 and about 95 wt % ethylene and between about 5 and about 20 wt % acrylic acid. An example of a suitable ethylene/acrylic resin for a coating powder is Envelon® 5000 sold by DOW Chemical Company. The coating powder may be unfilled or filled with pigments and/or coatings, typically between about 1 and about 50 phr. The thickness of the elastomeric coating will depend upon the requirements of the manufacturer, but will typically be relatively thick to provide sufficient impact resistance. Coating thickness of about 5 mil or above are typical, more typically about 10 mil or above up to about 20 mil.

The invention will now be described in greater detail by way of specific Examples.

EXAMPLES 1–7 (comparative) and 8

High-tensile steel coated springs were first treated with $ZnPO_4$ and then coated with an epoxy-based coating powder to provide a 2.5 mil coating and/or a thermoplastic elastomer coating to provide a 15 mil coating. All coatings were applied and processed at or below 325° F. After the coating (s) were formed, the coated springs were subjected to General Motor's's "Chip Resistance of Coating" test (GM published test no. GM9508P) followed by GM's "Scab Corrosion Creepback Test" (GM published test no. GM9511P).

Coating systems:
1. Zinc phosphate+Corvel® 10-7017 Black Epoxy
2. Zinc phosphate+Corvel® 10-7017 Black Epoxy+HG-7001*
3. Zinc phosphate+Corvel® 10-7001 Black epoxy+DG-7001**
4. Zinc phosphate+Corvel® HG-7001*
5. Zinc phosphate+Corvel® DG-7001**
6. Zinc phosphate+Corvel® 13-7004***
7. Zinc phosphate+Corvel® 13-7004***+HG-7001*
8. Zinc phosphate+Corvel® 13 7004*+DG-7001 poly(propylene) coating powder
poly(ethylene/acrylic acid copolymer) coating powder (10 wt % acrylic acid, 90 wt % ethylene)
zinc-rich epoxy (250 phr Zn)

Test Results:

|    | Gravelometer | Scab Corrosion |
| --- | --- | --- |
| 1. | Poor | Fail |
| 2. | Delamination (between layers) | Fail |
| 3. | Slight Damage | Fail |
| 4. | Disbonded | Fail |
| 5. | Slight Damage | Fail |
| 6. | Very Poor | Fail |
| 7. | Delamination | Fail |
| 8. | Slight Damage (to EA.) | PASS |

What is claimed is:

1. A dual-layer coating on high-tensile steel comprising a first, cured epoxy coating containing at least about 75 parts per hundred resin zinc in powder or flake form and a second coating consisting essentially of ethylene/acrylic copolymer, said first coating being applied to said high-tensile steel as a powder and fused and cured, and said second coating being applied as a powder over said first fused and cured coating and fused thereon, said dual layer coating providing chip-resistance and corrosion-resistance to said high-tensile steel.

2. The dual-layer coating according to claim 1 wherein both said first and the second coatings are applied as coating powders, and each coating powder is fused or fused and cured at temperatures at or below 325° F.

3. The dual-layer coating according to claim 1 wherein said first coating is at least about 1.5 mil thick.

4. The dual-layer coating according to claim 1 wherein said second coating is at least about 5 mil thick.

5. The dual-layer coating according to claim 1 wherein said second coating is at least about 10 mil thick.

6. The dual-layer coating according to claim 1 wherein said second coating is at least about 15 mil thick.

7. A dual-layer coating on high-tensile steel comprising a first, cured epoxy coating containing at least about 75 parts per hundred resin zinc in powder or flake form and a second coating consisting essentially of ethylene/acrylic copolymer, said first coating being applied to said high-tensile steel as a powder and fused and cured, and said second coating being applied as a powder over said first fused and cured coating and fused thereon, said dual layer coating providing to said high-tensile steel: chip-resistance sufficient to pass General Motors published test no. GM9508P, and corrosion-resistance sufficient pass General Motors published test no. GM9511P.

8. A method of coating high-tensile steel to produce the dual-layer coating of claim 1 so as to impart chip-resistance and corrosion-resistance to said high-tensile steel, said method comprising:
   providing an epoxy coating powder containing at least about 75 parts per hundred resin zinc in powder or flake form,
   applying said epoxy coating powder to said high-tensile steel,
   heating said epoxy coating powder to fuse and cure the same to provide a first zinc-rich coating on said high tensile steel,
   providing a coating powder consisting essentially of ethylene/acrylic copolymer,
   applying said ethylene/acrylic copolymer coating powder on said first zinc-rich coating, and
   heating said ethylene/acrylic copolymer coating powder to fuse the same so as to form a second coating over said first zinc-rich coating.

9. The method according to claim 8 wherein said epoxy coating powder is fused and cured at or below 325° F. and said ethylene/acrylic copolymer coating powder is fused at or below 325° F.

10. The method according to claim 8 wherein said first zinc-rich coating is formed to a thickness of at least about 1.5 mil.

11. The method according to claim 8 wherein said second coating is formed to a thickness of at least about 5 mil.

12. The method according to claim 8 wherein said second coating is formed to a thickness of at least about 10 mil.

13. The method according to claim 8 wherein said second coating is formed to a thickness of at least about 15 mil.

14. The method according to claim 8 wherein said first and second coatings are of sufficient thickness to provide to said high-tensile steel chip-resistance sufficient to pass General Motors published test no. GM9508P, and corrosion-resistance sufficient pass General Motors published test no. GM9511P.

* * * * *